US008091711B2

(12) United States Patent
Hsiau et al.

(10) Patent No.: US 8,091,711 B2
(45) Date of Patent: Jan. 10, 2012

(54) DYNAMICALLY ADAPTIVE TROMMEL SCREEN SYSTEM

(75) Inventors: Shu-San Hsiau, Taipei (TW); Hsuan-Yi Lee, Taoyuan (TW); Yau-Pin Chyou, Taipei (TW); Jiri Smid, Prague (CZ); Yi-Shun Chen, Taipei (TW); Po-Chuang Chen, Pingjen (TW); Chin-Ching Tzeng, Lin-kou Township, Taipei County (TW); Chia-Jen Hsu, Yunlin (TW)

(73) Assignee: Atomic Energy Council-Institute of Nuclear Energy Research, Taoyuan County (TW)

( * ) Notice: Subject to any disclaimer, the term of this patent is extended or adjusted under 35 U.S.C. 154(b) by 224 days.

(21) Appl. No.: 12/490,598

(22) Filed: Jun. 24, 2009

(65) Prior Publication Data

US 2010/0326892 A1 Dec. 30, 2010

(51) Int. Cl.
*B07B 1/18* (2006.01)
*G05B 13/00* (2006.01)

(52) U.S. Cl. .......................................... 209/284; 700/28

(58) Field of Classification Search .................. 209/260, 209/284; 700/28, 32
See application file for complete search history.

(56) References Cited

U.S. PATENT DOCUMENTS

| | | | | | |
|---|---|---|---|---|---|
| 2,204,835 | A * | 6/1940 | Eisenhand et al. | ............ | 209/399 |
| 3,139,217 | A * | 6/1964 | Mell | ............ | 222/57 |
| 3,724,720 | A * | 4/1973 | Bullivant | ............ | 222/55 |
| 4,090,241 | A * | 5/1978 | Houston | ............ | 700/117 |
| 4,178,238 | A * | 12/1979 | Harris | ............ | 209/270 |
| 5,427,250 | A * | 6/1995 | Page et al. | ............ | 209/284 |
| 5,437,882 | A * | 8/1995 | Greer et al. | ............ | 426/231 |
| 5,507,396 | A * | 4/1996 | Hauch | ............ | 209/399 |
| 5,819,950 | A * | 10/1998 | McCloskey | ............ | 209/241 |
| 6,006,921 | A * | 12/1999 | Zehr | ............ | 209/288 |
| 2003/0004602 | A1 * | 1/2003 | Koffron et al. | ............ | 700/146 |
| 2005/0045052 | A1 * | 3/2005 | Cohen et al. | ............ | 100/104 |
| 2006/0237346 | A1 * | 10/2006 | Fridman et al. | ............ | 209/288 |
| 2007/0215206 | A1 * | 9/2007 | Lull et al. | ............ | 137/10 |
| 2007/0219650 | A1 * | 9/2007 | Wang et al. | ............ | 700/73 |
| 2010/0070073 | A1 * | 3/2010 | Foley et al. | ............ | 700/240 |
| 2011/0066293 | A1 * | 3/2011 | Haggerty et al. | ............ | 700/282 |

FOREIGN PATENT DOCUMENTS

| | | |
|---|---|---|
| DE | 3546133 | 7/1987 |
| DE | 8808236 | 9/1988 |
| DE | 20022079 | 4/2001 |
| DE | 20314575 | 11/2003 |
| GB | 2438076 | 11/2007 |

* cited by examiner

*Primary Examiner* — Joseph C Rodriguez
(74) *Attorney, Agent, or Firm* — Ming Chow; Sinorica, LLC

(57) ABSTRACT

A dynamically real-time adaptive trommel screen system is revealed. The dynamically adaptive trommel screen system includes a fixture, a trommel screen disposed on the fixture for screening a mixture into regenerated filter granules and screened residues, a structured duct for transporting the regenerated filter granules and an enclosure for collecting the screened residues, a tilt control member arranged on the fixture for adjusting the tilt angle of the trommel screen, and a feedback controller that controls the tilt control member according to the mass flow rate of the screened residues when the trommel screen operates so as to adjust the tilt angle of the trommel screen instantly and dynamically. By the feedback controller and the tilt control member, the tilt angle of the trommel screen is adjusted in a real-time and dynamic way so as to increase the screening efficiency. Moreover, the state of fractured filter granules is acquired from the feedback controller so that a certain amount of fresh filter granules can be refilled into the filter system for improving the filtration efficiency.

11 Claims, 6 Drawing Sheets

DYNAMICALLY ADAPTIVE TROMMEL SCREEN SYSTEM

BACKGROUND OF THE INVENTION

1. Field of Invention

The present invention relates to a trommel screen, especially to a trommel screen system for separating fly ash from filter granules in the hot gas granular moving bed filter with a dynamically real-time adaptive function.

2. Description of Related Art

Granular moving bed filters have been developed for high-temperature flue gas cleanup. In principle, the filter granules are chemically inert, although they have been considered to remove particulates, e.g. fly ash and alkali from PFBC and IGCC flue gases simultaneously.

The concentration of fly ash in the flue gas (syngas), entering granular moving bed apparatus (e.g. granular moving bed filter or moving bed adsorber) changes in time, according to type of fuel, character of gasification or conditions of burning. To keep the filtration efficiency in granular moving bed filter/adsorber stable and uniform in time, it is necessary to optimize the mass flow rate of granular filter medium in moving bed. When the concentration of fly ash in flue gas is high, it is advisable to increase the velocity of filter granules and remove dirty filter granules with fly ash from moving bed apparatus faster. When the concentration of fly ash is low, it is suitable to decrease the mass flow rate of granules in moving bed. The mass flow rate of granular filter/sorbent medium is controlled by a rotary feeder under the feeding hopper of trommel screen system.

Granular filter/sorbent medium in moving bed can flow continuously or intermittently. The advantage of intermittent (batch mode) running of moving bed consists in formation of thin filter cake on the contact surface of moving bed with flue gas. This thin filter cake increases efficiency of filtration while running moving bed at relatively low pressure drop of gas.

Dirty granular filter/sorbent medium (e.g. filter granules with fly ash or spent sorbent granules with rest of fly ash) from moving bed apparatus is introduced into the trommel screen, where filter granules or sorbent granules and fly ash are separated. To keep a high level in separation efficiency, it is useful to run this equipment continuously, even when moving bed granules enter the trommel screen with low or high fly ash concentration and in continuous or intermittent (batch mode) cycle.

Separation efficiency of fly ash from moving bed granules depends predominantly on the residence time of mixture of moving bed granules and fly ash in the trommel screen. A reduction of rotating speed influences the separation efficiency negatively. On the contrary, the inclination of trommel screen influences the residence time of moving bed granules significantly. So, it is advisable to change the inclination of central axis of the trommel screen according to the mass flow rate of fly ash leaving the revolving trommel screen. The mass flow rate of fly ash could be measured by an impact flow meter.

For example, in the prior art, German patent No. 3546133 describes apparatus and method to the washing and filtration (dewatering) a slurried mineral mixture in a rotary, vibrated and perforated drum. Oscillations of the drum are controlled by hydraulic cylinders. Longitudinal axis of the drum is adjusted inclined in the process of filtration. Its inclination can be changed according to flowability of slurry in order to affect continuous flow rate and residence time of slurried mineral mixture in rotary drum. According to UK patent No. 2438076, a rotary screen drum has an inlet at a lower level than an outlet, such that if the apparatus becomes blocked, material flows of preference back into the inlet rather than out of the outlet. In other terms, the screen drum is angled upwards from inlet to outlet. During normal usage, when not blocked, the drum may be used in a horizontal orientation. The drum is driven rotationally by a motor, and an internal screw thread arrangement may progress material along the length of the drum. The orientation of the drum may be adjusted with an actuator.

Referring to German Utility Patent No. 20022079 U1, the central axis of the trommel screen is horizontal or inclined. The transport of bulk material in trommel screen is influenced by the inclination angle of trommel screen and by guidance sheet metals inside it. Furthermore, in the German Utility Patent No. 8808236 U1, the base frame of trommel screen has a turn-around axle in order to be able to adjust the inclination of the central axis of the trommel screen. Additionally, in the German Utility Patent No. 20314575 U1, the sieve assembly comprises a driven trommel screen with a horizontal central axis, of which the inclination is adjustable.

All above mentioned apparatuses are set to fixed inclination of cylindrical or polygonal drum. The angle of inclination can be changed providing that trommel screen is put out of operation. Fast reaction to changing operation conditions such as a change of dust concentration in flue gas or change of mass flow rate of filter granules in moving bed is not possible.

Although the above prior art can screen out fresh sand whose filter granule size falls in operating diameter range (0.1 mm-10 mm), in practice the apparatus is still unable to meet general demands.

Thus there is a need to provide a dynamically real-time adaptive trommel screen that dynamically adjusts operation of the trommel screen in time according to the mass flow rate of the screened residues so as to improve the screening (separation) efficiency and match users' requirements.

SUMMARY OF THE INVENTION

Therefore it is a primary object of the present invention to provide a dynamically real-time adaptive trommel screen system in which a trommel screen is used to separate small-size screened residues from filter granules so that the clean filter granules can be recycled and used again to reduce the cost.

It is another object of the present invention to provide a dynamically real-time adaptive trommel screen system that includes a tilt control member and a feedback controller for adjusting the tilt angle of a trommel screen that screens the mixture instantly and dynamically according to the mass flow rate of screened residues during screening processes so as to improve screening efficiency.

It is a further object of the present invention to provide a dynamically real-time adaptive trommel screen system that adjusts flow rate of mixture being sent to the trommel screen by a flow control member so as to improve the screening efficiency.

It is a further object of the present invention to provide a dynamically real-time adaptive trommel screen system that detects the status of fractured filter granules by a feedback controller so that a certain amount of fresh filter granules is filled into the filter system. The filtration efficiency is further improved.

In order to achieve above objects, a dynamically real-time adaptive trommel screen system of the present invention includes a fixture, a trommel screen, a structured duct and conveyor for regenerated filter granules, a conveyor enclosure for screened residues, a tilt control member and a feedback controller. The trommel screen with a plurality of screen meshes is arranged on the fixture for screening a mixture into regenerated filter granules and screened residues. The conveyor for regenerated filter granules and the conveyor for screened residues are disposed under the trommel screen for delivering the regenerated filter granules and the screened residues screened out by the trommel screen, respectively. The tilt control member is arranged on the fixture for adjusting the tilt angle of the trommel screen. During operation of the trommel screen, the feedback controller controls the tilt control member instantly and dynamically according to the mass flow rate of the screened residues so as to adjust the tilt angle of the trommel screen in an instant and dynamic way. Thus the screening efficiency of the trommel screen is improved. Moreover, the filter granules might get fractured while flowing in the filter system. By the feedback controller, the state of the fractured filter granules in the screened residues is acquired so that a certain amount of fresh filter granules is refilled into the filter system for attaining higher filtration efficiency.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
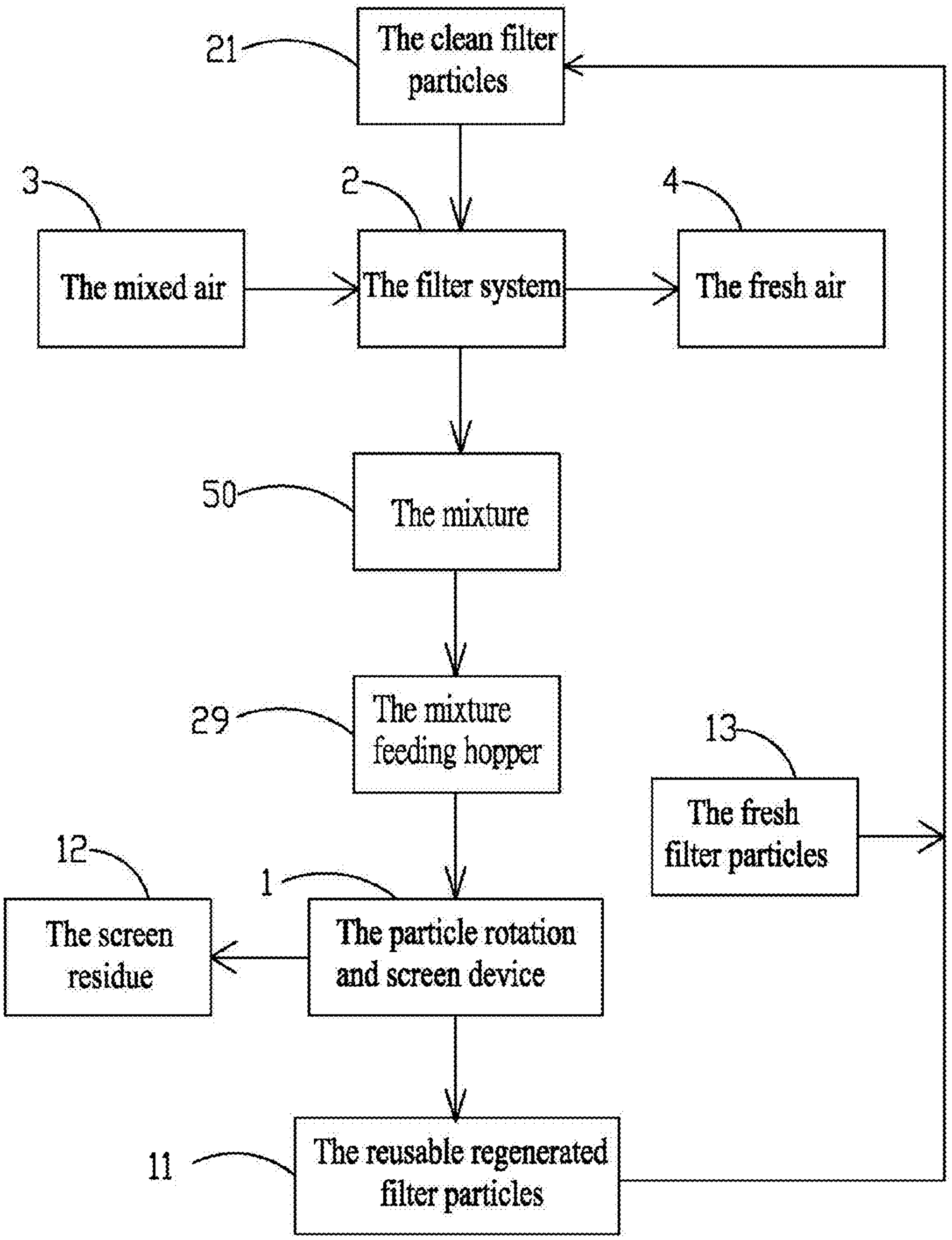
FIG. 1 is a schematic drawing of an embodiment of a trommel screen system applied to a filter system.
Figure 2A:
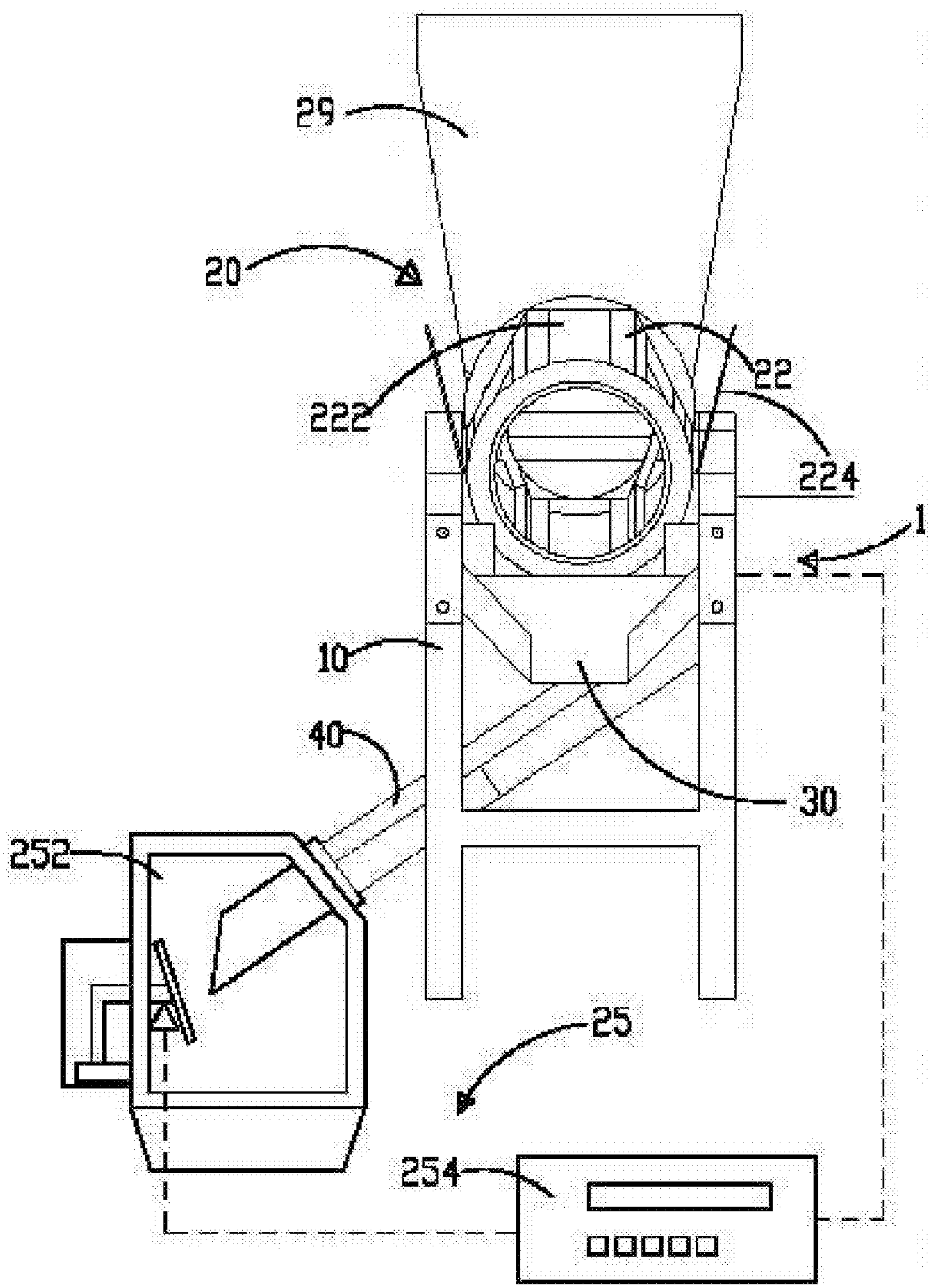
FIG. 2A is a front view of an embodiment according to the present invention.
Figure 2B:
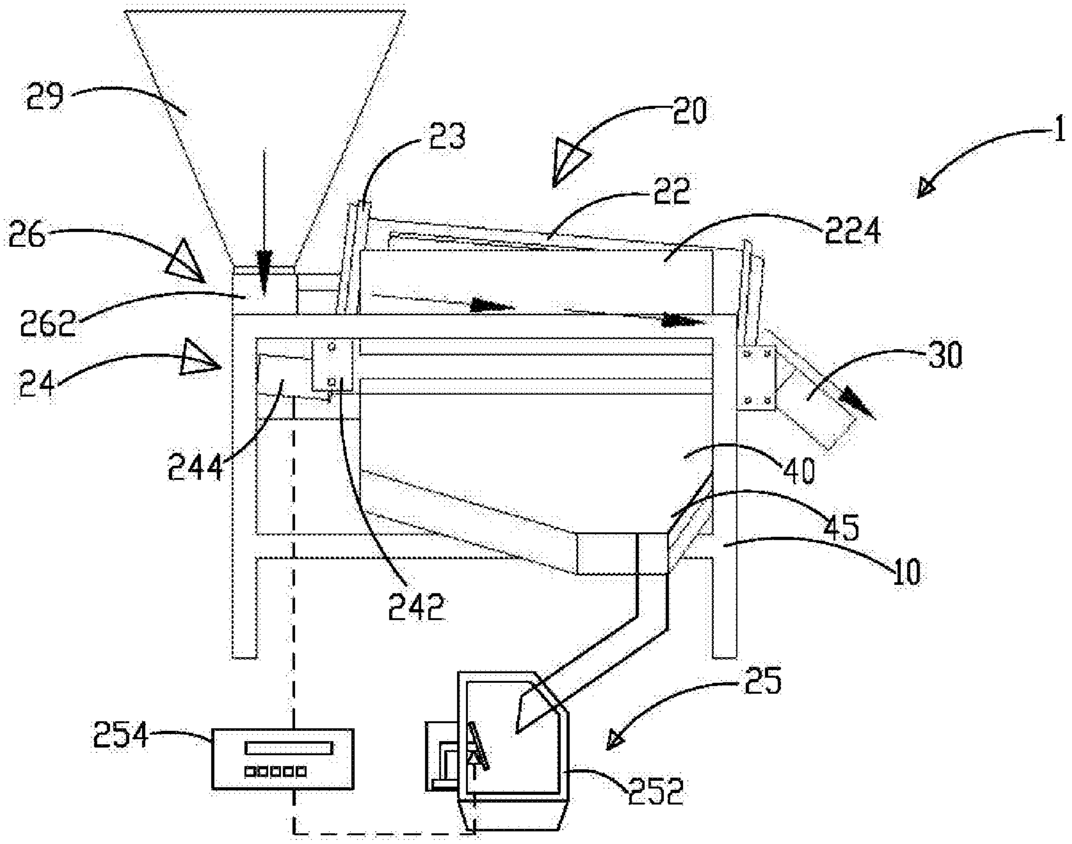
FIG. 2B is a side view of an embodiment according to the present invention.

Referring to FIGS. 1, 2A, and 2B, an application in a filter system, a front view and a side view of an embodiment of a trommel screen system according to the present invention are revealed. The trommel screen system 1 is applied to a filter system 2 that filters flue gas 3 (dirty inlet gas) in industrial processes so as to generate clean gas 4. The inlet gas 3 can also be raw syngas from gasifiers. By contact with clean filter granules 21 of the filter system 2, dust in the flue gas 3 (dirty inlet gas) is collected in the filter granules to generate the clean gas 4. Thus the filter granules 21, after passing through the filter system 2, are turned into a mixture 50 due to filtration of dust.

By means a feeding hopper 29 of trommel screen system, the mixture 50 discharged from the filter system 2 is transported to the trommel screen system 1, where regenerated filter granules 11 and screened residues 12 are separated from the mixture 50. The regenerated filter granules 11 are recovered and mixed with fresh granules 13 to form clean filter granules 21 and transported to the filter system 2. The filter granules are used repeatedly so as to reduce the cost. Moreover, the clean filter granules 21 might get fractured owing to the collision among the filter granules during filtration process. Thus the mixture 50 includes recoverable regenerated filter granules 11 and screened residues 12 which consist of dust and fractured granules. The screened residues 12 are unable to be recovered and reused in the filter system 2. Therefore, the screened residues 12 screened by the trommel screen system 1 of the present invention consists of dust and fractured granules.

The trommel screen system 1 according to the present invention includes a fixture 10, a trommel screen 20, a conveyor for regenerated filter granules 30, and a conveyor for screened residues 40, as shown in FIG. 2A The trommel screen 20 is disposed on the fixture 10 to separate the mixture 50 into regenerated filter granules 11 and screened residues 12. The trommel screen 20 consists of a plurality of screen meshes 2222 (in FIG. 3) that separates small-size screened residues 12 from the mixture 50 so as to get regenerated filter granules 11 that are reusable and reduce the cost. The conveyor for regenerated filter granules 30 is arranged in front of the trommel screen 20 to convey the regenerated filter granules 11 being screened by the trommel screen 20. The conveyor for screened residues 40 is disposed under the trommel screen 20 for conveying the screened residues 12 filtered out by the trommel screen 20. The screened residues 12 contain dust and fractured granules.

Generally, the dust concentration of flue gas 3 (dirty inlet gas) that passes the filter system 2 is varied according to operation environment in industrial processes. For example, dust concentration of flue gas in the incineration furnace changes with different fuel, gasification characters or combustion conditions in real time. Thus once the dust of flue gas 3 (dirty inlet gas) is collected by clean filter granules 21, the dust concentration of the used filter granules also varies.

In order to adapt to the variations in dust concentration of flue gas, the mass flow rate of filter granules in the filter system 2, e.g. a granular moving bed filter, needs to be adjusted efficiently and effectively so as to remain stable and consistent filtration efficiency. When the dust concentration of the flue gas 3 (dirty inlet gas) is higher, the mass flow rate of filter granules in the granular moving bed filter should be increased. On the other hand, when the dust concentration of the flue gas 3 (dirty inlet gas) is lower, the mass flow rate of the filter granules in the granular moving bed filter can be reduced. The adjustment of the mass flow rate of filter granules in the granular moving bed filter is achieved by a rotational feeding mechanism disposed under the feeding hopper. The feeding hopper is used to receive the filter granules with the dust that is discharged from the granular moving bed filter. Thus the mass flow rate of the filter granules in the granular moving bed filter is adjusted by the rotational feeding mechanism.

The flow pattern of the moving granular bed filter can be continuous or intermittent (batch mode) so that filter granules flows in the moving granular bed filter continuously or intermittently. The advantage of the intermittent flow pattern is that dust cake can be formed on the free surface between the moving granular bed filter and the flue gas 3 (dirty inlet gas). The dust cake improves the filtration efficiency. According to different flow patterns of the filter system 2, the trommel screen system 1 of the present invention can also be operated in a continuous or intermittent way. Moreover, in order to maintain higher screening efficiency, the trommel screen system 1 can remain in operation continuously, no matter the dust concentration collected by the filter granules (mixture 50) in the trommel screen system 1 is high or low and no matter the filter system is in continuous or intermittent operation.

Figure 3:
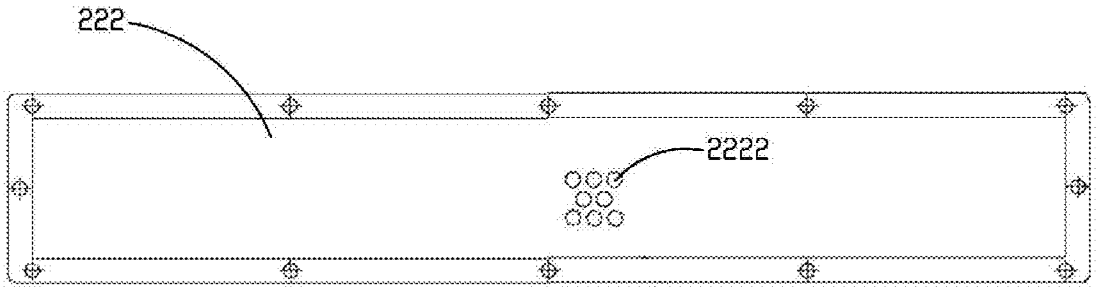
FIG. 3 is a schematic drawing showing a screen of an embodiment according to the present invention.

Referring to FIGS. 2A, 2B, and 3, the trommel screen 20 is composed of a trommel body 22 and a mounting bracket 23. The trommel body 22 is disposed on the mounting bracket 23 while the mounting bracket 23 is arranged on the fixture 10. At least one screen 222 with screen meshes 2222 is arranged on the sides of the trommel body 22 circumferentially. In an embodiment of the present invention, the mesh size (slot width) of the screen mesh 2222 is 2 mm while the distance between centers of the two adjacent meshes is 3 mm; however, these dimensions are for illustration purpose only and the present invention is not whereby restricted. The trommel body 22 is driven by a drive motor (not shown in figure) and is rotated on the mounting bracket 23. When the mixture 50 enters the trommel body 22, the screened residues 12 (formed by dust and fractured granules) and regenerated filter granules 11 are separated from each other during the rotation of trommel body 22. By the screen 222, the small-size screened residues 12 (dust and fractured granules) are screened out. Furthermore, the operator of the present invention further includes a plurality of shield mechanisms 224 disposed on two sides of the trommel screen 20 to prevent sputtering of dust and fractured filter granules from the trommel body 22 when the trommel screen 20 rotates to separate the mixture 50.

The trommel body 22 is a polygonal column. In this embodiment, a hexagonal column is used as an example. The trommel body 22 is installed over the fixture 10 slantwise or horizontally and is rotated by a drive gear set (not shown in figure) driven by the motor. The trommel body 22 is rotated by driving force of the motor and the optimal motor speed ranges from 1 rpm to 200 rpm. The rotation of the device driven by the motor is a common technique and is not described in details and shown in the figures. The preferable length of the trommel body 22 is 200 to 400 times of the mesh size of the screen mesh 2222 while the optimal width is 50 to 100 times of the mesh size of the screen mesh 2222. An embodiment of the screen 222 is a punch-hole plate with preferable thickness of 1 mm. The screen 222 can be further treated with electroplating so as to prevent attrition caused by friction between the screen 222 and the filter granules.

Figure 4:
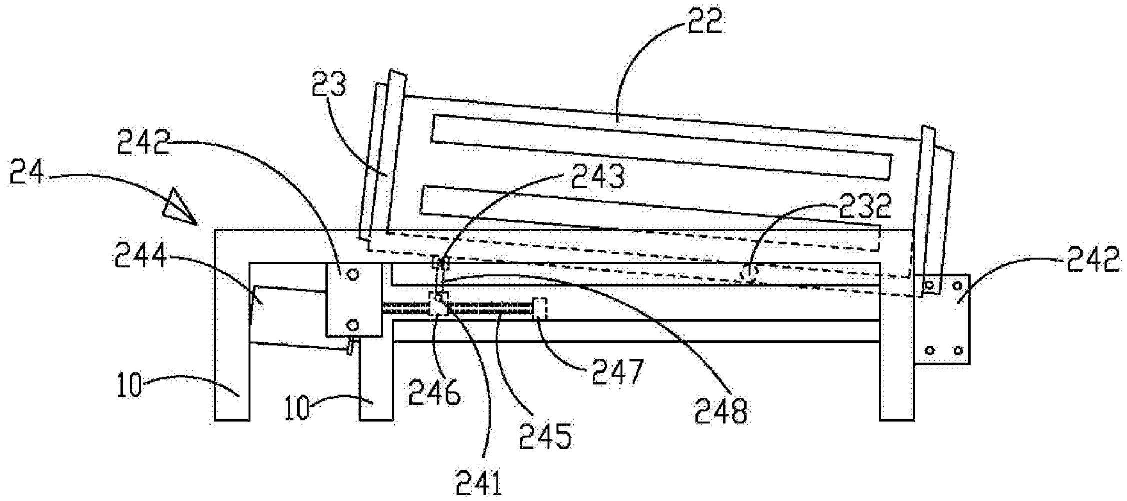
FIG. 4 is a schematic drawing showing a tilt control member of an embodiment according to the present invention.

Referring to FIG. 4, a schematic drawing of a tilt control member is revealed. In order to control screening efficiency of the trommel screen 20, the trommel screen system 1 of the present invention further includes a tilt control member 24 so as to adjust the tilt angle between the trommel screen 20 and the fixture 10. The tilt control member 24 controls the tilt angle of the trommel screen 20 by adjusting the angle between the mounting bracket 23 and the fixture 10. The mounting bracket 23 is disposed on the fixture 10 by a pin 232 so that the mounting bracket 23 is rotatable in relation to the fixture 10 and is able to adjust the angle of the mounting bracket 23 tilted to the fixture 10. The trommel body 22 is disposed on the mounting bracket 23 so that the tilt angle of the trommel body 22 toward the fixture 10 changes with the rotation of the mounting bracket 23. That's the way the tilt angle of the trommel screen 20 is adjusted.

The tilt control member 24 for adjusting tilt angle of the mounting bracket 23 is set on one end of the fixture 10. The tilt control member 24 consists of a tilt fixer 242 and an adjusting motor 244. The tilt fixer 242 is arranged on the fixture 10 while the adjusting motor 244 is disposed on one end of the fixture 10 and is connected with the tilt fixer 242.

Moreover, the tilt control member 24 includes a threaded rod 245, a moving mechanism 246, a nut 247, and a connecting rod 248. The threaded rod 245 is connected with the adjusting motor 244, the moving mechanism 246 is arranged on the threaded rod 245, the nut 247 is disposed on the fixture 10, and the rear end of the threaded rod 245 is mounted on the nut 247. The two ends of the connecting rod 248 are connected with the moving mechanism 246 and the mounting bracket 23 by two joints 241 and 243, respectively. When the adjusting motor 244 operates, the threaded rod 245 is driven to rotate so that the moving mechanism 246 moves forward or backward along the threaded rod 245 and further drives the connecting rod 248 moving forward or backward. Thus the mounting bracket 23 rotates around the pin 232. Therefore, the tilt angle of the trommel body 22 is adjusted. The tilt angle of the trommel body 22 is controlled by the relative position between the nut 247 and the connecting rod 248. Furthermore, the above tilt control member 24 is only one of the embodiments. Various changes and modifications of the tilt control member 24 can be implemented, for example, with hydraulic method.

The screening efficiency of the trommel screen system 1 correlates to the residence time of the mixture 50 stayed within the trommel screen 20. The longer the mixture 50 resided at the trommel screen 20, the higher the screening efficiency. Thus the residence time is considered as an important factor of screening efficiency. By control of rotation speed and tilt angle of the trommel screen 20, the residence time of the mixture 50 stayed within the trommel screen 20 is controlled so as to improve the screening efficiency of the trommel screen 20. According to the operating conditions at industrial processes, such as properties of feed-in fuels, combustion or gasification conditions, the dust concentration of the flue gas 3 (dirty inlet gas) changes. By measurement of the mass flow rate of the dust in the trommel screen 20 after screening, the screening efficiency at this moment is estimated. Then the rotation speed and the tilt angle of the trommel screen 20 are further adjusted to remain high screening efficiency.

The trommel screen system 1 further includes a feedback controller 25 that dynamically real-time measures the mass flow rate of the screened residues 12 when the trommel screen 20 operates. That means the screening efficiency of the trommel screen 20 at this moment is estimated by measuring the mass flow rate of dust and of fractured granules for further control of the tilt control member 24. Thus the tilt angle of the trommel screen 20 is adjusted in a real-time and dynamic way. Moreover, the drive motor that drives the trommel screen 20 is also controlled by the feedback controller 25 so as to adjust the rotation speed of the trommel screen 20 dynamically, of which the high screening efficiency is thereby maintained.

The feedback controller 25 includes a measurement unit 252 and a control unit 254. The measurement unit 252 is connected with the conveyor for screened residues 40 to measure the mass flow rate of the screened residues 12. In this embodiment, the measurement unit 252 is a flow meter which can be an impact flow meter. There are various embodiments of the measurement unit 252. Besides the flow meter, the measurement unit 252 can be other measuring instruments such as electronic scales. Moreover, in order to prevent screened residues dispersed over the air and the surrounding environment during the processes of delivering the screened residues 12 to the measurement unit 252 by the conveyor for screened residues 40, the device of the present invention further includes a cover 45 disposed between the conveyor for screened residues 40 and the measurement unit 252 of the feedback controller 25.

As to the control unit 254, it is connected with the measurement unit 252 and the tilt control member 24 so as to obtain the mass flow rate of the screened residues 12 detected by the measurement unit 252. According to the mass flow rate, the tilt control member 24 is controlled by the control unit 254 for real-time and dynamic adjustment of the tilt angle of the trommel screen 20. In this embodiment, the control unit 254 is connected with the adjusting motor 244 for control of the operation of the adjusting motor 244 so as to adjust the tilt angle of the trommel screen 20. Furthermore, the control unit 254 can also adjust rotation speed of the trommel screen 20 in a real-time and dynamic way. The control unit 254 can be a computer for dynamically real-time monitoring.

When the trommel screen 20 operates, the feedback controller 25 detects the mass flow rate of the screened residues 12 in real time so as to get the screening efficiency of the trommel screen 20. Then the tilt angle or rotation speed of the trommel screen 20 is adjusted dynamically so as to maintain the screening efficiency. Once the dust concentration in the flue gas 3 (dirty inlet gas) moving in the filter system 2 is higher, the dust concentration of the mixture 50 entering the trommel screen 20 is also higher. Thus the residence time of the mixture 50 stayed within the trommel screen 20 needs to be increased for maintaining the screening efficiency in a high level. By means of the control unit 254 that controls the tilt control member 24, the tilt angle of the trommel screen is adjusted dynamically. Thus the tilt angle of the trommel screen 20 is reduced for increasing the residence time of the mixture 50 stayed within the trommel screen 20. Therefore, the screening effect is improved.

On the other hand, if the dust concentration in the flue gas 3 (dirty inlet gas) moving in the filter system 2 is lower, the dust concentration of the mixture 50 entering the trommel screen 20 is lower relatively. That means less amount of dust enters the trommel screen 20 and less amount of dust is screened out. Thus the mass flow rate of the screened residues 12 detected by the feedback controller 25 is reduced. Due to low dust concentration of the mixture 50, the residence time of the mixture 50 stayed within the trommel screen 20 can be reduced. The tilt angle of the trommel screen 20 is adjusted to be increased for reducing the residence time of the mixture 50 stayed within the trommel screen 20. Thus the total amount of the mixture 50 passing through the trommel screen 20 is increased and the screening speed is increased. Moreover, when the trommel screen 20 operates, the mass flow rate of the screened residues 12 is detected by the feedback controller 25 in real time so that the tilt control member 24 is controlled in a dynamic and real-time way correspondingly. Thus the tilt angle of the trommel screen 20 is adjusted instantly and dynamically. Therefore, the screening efficiency of the trommel screen 20 is maintained in a high level.

Furthermore, the control unit 254 monitors the mass flow rate of the screened residues 12 in the long term so that the screening status of the trommel screen 20 under different conditions can be traced and recorded efficiently. Thus the tilt angle and the rotation speed of the trommel screen 20 are adjusted instantly and dynamically. The dust concentration of the flue gas 3 (dirty inlet gas) is estimated according to actual operation conditions so that the amount of the dust screened out from the mixture 50 by the trommel screen system 1 is estimated according to the filtration efficiency of the filter system 2. Thus by the mass flow rate of the screened residues 12 and the amount of dust being screened out, the state of the fractured granules in the screened residues 12 is acquired. The fractured granules produced in the filter system 2 can also be known. By means of automatic feeding of fresh filter granules 13, a certain amount of clean filter granules is refilled into the filter system 2 so as to keep the filter system in a better state. And the cost is further reduced.

Figure 5:
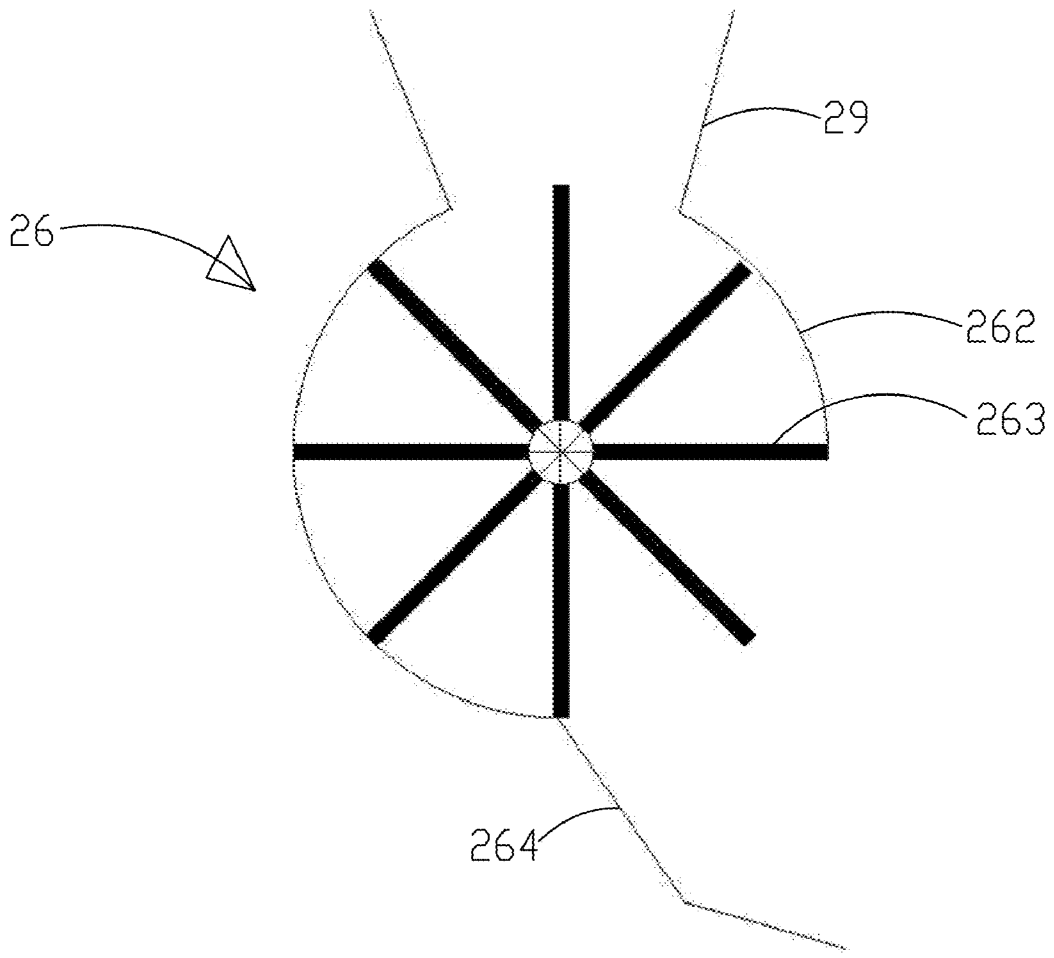
FIG. 5 is a schematic drawing showing a flow control member of an embodiment according to the present invention.

Referring to FIG. 5, a schematic drawing of a flow control mechanism of an embodiment according to the present invention is disclosed. As shown in figure, the present invention further includes a flow rate control mechanism 26 that is disposed on the fixture 10 and is connected with the trommel screen 20. The flow rate control mechanism 26 is composed of a mass flow controller 262 and a medium discharger 264. The mass flow controller 262 is arranged on the fixture 10 to receive the mixture 50 from the filter system 2. The medium discharger 264 is disposed under the mass flow controller 262 and is connected with the trommel screen 20. The rotating blades 263 are disposed in the mass flow controller 262 so as to deliver the mixture 50 of the filter system 2. By control of the rotation speed of the rotating blades 263, the flow rate of the mixture 50 sent from the mass flow controller 262 to the medium discharger 264 is controlled. Then the medium discharger 264 conveys the mixture 50 to the trommel screen 20.

Moreover, the present invention further includes the feeding hopper 29 arranged over the mass flow controller 262 for guiding the mixture 50 to the mass flow controller 262 so that the flow rate of the mixture 50 into the trommel screen 20 can be controlled conveniently. Furthermore, the feeding hopper 29 can also be disposed on the trommel screen 20 directly for direct delivery of the mixture 50 to the trommel screen 20. In an embodiment of the present invention, the feeding hopper 29 is made from stainless steel and is for receiving the mixture 50 containing dust and filter granules exhausted from bottom of the filter system 2.

In summary, a dynamically real-time controlled trommel screen system 1 of the present invention includes a fixture 10 that is used to dispose a trommel screen 20. The trommel screen 20 separates mixture 50 into regenerated filter granules 11 and screened residues 12. The dynamically real-time controlled trommel screen system 1 further consists of a tilt control member 24 and a feedback controller 25. The feedback controller 25 controls the tilt control member 24 instantly and dynamically according to the mass flow rate of the screened residues 12 so as to adjust the tilt angle of the trommel screen 20 dynamically. By instantly and dynamically real-time adjustment of the tilt angle of the trommel screen 20, the screening efficiency of the trommel screen 20 is increased. Moreover, the state of fractured granules is acquired by the feedback controller 25 so as to refill fresh filter granules 13 into the filter system 2 for supplement of insufficient clean filter granules. Thus the filtration efficiency of the filter system 2 is maintained or increased.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended and their equivalents.

What is claimed is:

1. A dynamically real-time adaptive trommel screen system comprising:

a fixture;

a trommel screen with a plurality of screen meshes disposed on the fixture for screening a mixture into regenerated filter granules and screened residues;

a structured duct and conveyor for regenerated filter granules disposed on the trommel screen and designated to deliver the regenerated filter granules being screened out by the trommel screen;

a conveyor enclosure for screened residues disposed on the trommel screen and used for collecting the screened residues being screened out by the trommel screen;

a tilt control member for adjusting the tilt angle of the trommel screen arranged on the fixture; and a feedback controller that controls the tilt control member according to the mass flow rate of the screened residues when the trommel screen operates so as to adjust the tilt angle of the trommel screen instantly and dynamically, wherein the feedback controller includes a measurement unit that is connected with the conveyor enclosure for screened residues and measures the mass flow rate of the screened residues; and a control unit that connects the measurement unit with the tilt control member and controls the tilt control member to adjust the tilt angle of the trommel screen system according to the mass flow rate of the screened residues gauged by the measurement unit.

2. The system as claimed in claim 1, wherein the trommel screen system includes a mounting bracket disposed on the fixture; and a trommel body arranged on the mounting bracket and disposed with at least one screen with a plurality of screen meshes thereof surroundingly;

wherein the tilt control member adjusts the tilt angle of the mounting bracket so as to control the tilt angle of the body of trommel surroundingly.

3. The system as claimed in claim 2, wherein the tilt control member includes a tilt fixer arranged on the fixture;

an adjusting motor disposed on the fixture;

a threaded rod disposed on the adjusting motor;

a moving mechanism being inserted in and arranged on the threaded rod;

a connecting rod linking up the moving mechanism and the mounting bracket; and a nut arranged on one end of the threaded rod and fixed on the fixture.

4. The system as claimed in claim 1, wherein the measurement unit is a flowmeter.

5. The system as claimed in claim 1, wherein the feedback controller further controls the rotation speed of the trommel screen according to the mass flow rate of the screened residues.

6. The system as claimed in claim 1, wherein the dynamically real-time adaptive trommel screen system further includes a flow control mechanism that is disposed on the fixture and is connected with the trommel screen so as to adjust flow of mixture into the trommel screen.

7. The system as claimed in claim 6, wherein the flow control mechanism includes:

a flow controller that is arranged on the fixture to receive the mixture and control the flow rate of mixture being output; and a medium discharger that is disposed under the flow controller and is connected with the trommel screen for delivering the mixture output by the flow controller to the trommel screen.

8. The system as claimed in claim 1, wherein the trommel screen system further includes a mixture feeding hopper that connects with the trommel screen so as to deliver the mixture to the trommel screen.

9. The system as claimed in claim 1, wherein the trommel screen system further includes a plurality of shield members disposed on the both sides of the trommel screen.

10. The system as claimed in claim 1, wherein the trommel screen system further includes a cover disposed between the conveyor for screened residues and the feedback controller.

11. The system as claimed in claim 1, wherein the screened residues consist of dust and fractured granules.

* * * * *